United States Patent [19]

Keller

[11] Patent Number: 4,494,913
[45] Date of Patent: Jan. 22, 1985

[54] POSITIVE DISPLACEMENT INJECTOR

[75] Inventor: Philip J. Keller, Pompton Plains, N.J.

[73] Assignee: Bijur Lubricating Corp., Bennington, Vt.

[21] Appl. No.: 396,408

[22] Filed: Jul. 8, 1982

[51] Int. Cl.³ .............................................. F04B 35/00
[52] U.S. Cl. ..................................... 417/349; 222/335
[58] Field of Search .................. 417/349, 550, 556; 222/335

[56] References Cited

U.S. PATENT DOCUMENTS

| | | | |
|---|---|---|---|
| 873401 | 7/1961 | GBX . | |
| 991743 | 10/1951 | FRX . | |
| 1,590,868 | 6/1926 | Wallace | 417/550 |
| 2,413,044 | 12/1946 | Grise . | |
| 2,478,260 | 8/1949 | Fioretti | 222/335 |
| 3,119,463 | 1/1964 | Jackson | 222/335 |
| 3,393,841 | 7/1968 | Brehmer . | |
| 3,421,600 | 1/1969 | Gleason | 184/27 |
| 3,554,407 | 1/1971 | Des Roches | 417/550 |
| 3,699,961 | 10/1972 | Szpur | 417/550 |
| 4,079,866 | 3/1978 | Asioli . | |
| 4,125,276 | 11/1978 | Thrasher | 184/56 A |
| 4,300,658 | 11/1981 | Asioli . | |

*Primary Examiner*—William L. Freeh
*Attorney, Agent, or Firm*—Ostrolenk, Faber, Gerb & Soffen

[57] ABSTRACT

A positive displacement injector for automatic centralized lubrication systems is constructed to include a two-piece disk-seal valve assembly that acts as a check valve and also provides seals at oppositely facing surfaces. The assembly consists of a stiff disk sandwiched between upstream and downstream disks of a resilient seal member. Notches in the periphery of the stiff disk are normally blocked by the downstream disk to prevent upstream fluid flow through these notches, yet the periphery of the downstream disk is deflectable to permit downstream fluid flow through the notches when there is relatively high fluid pressure at the inlet port. The assembly is bodily movable so that with low fluid pressure at the inlet port this port is blocked by the upstream disk, and with high fluid pressure at the inlet port the downstream disk blocks axial input to an outlet passage.

5 Claims, 9 Drawing Figures

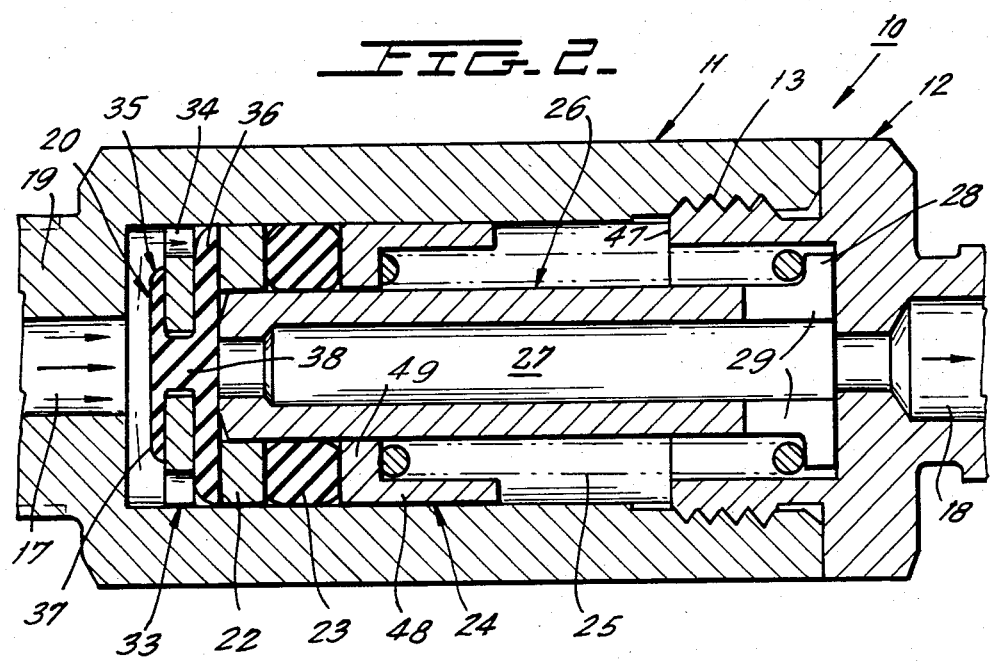
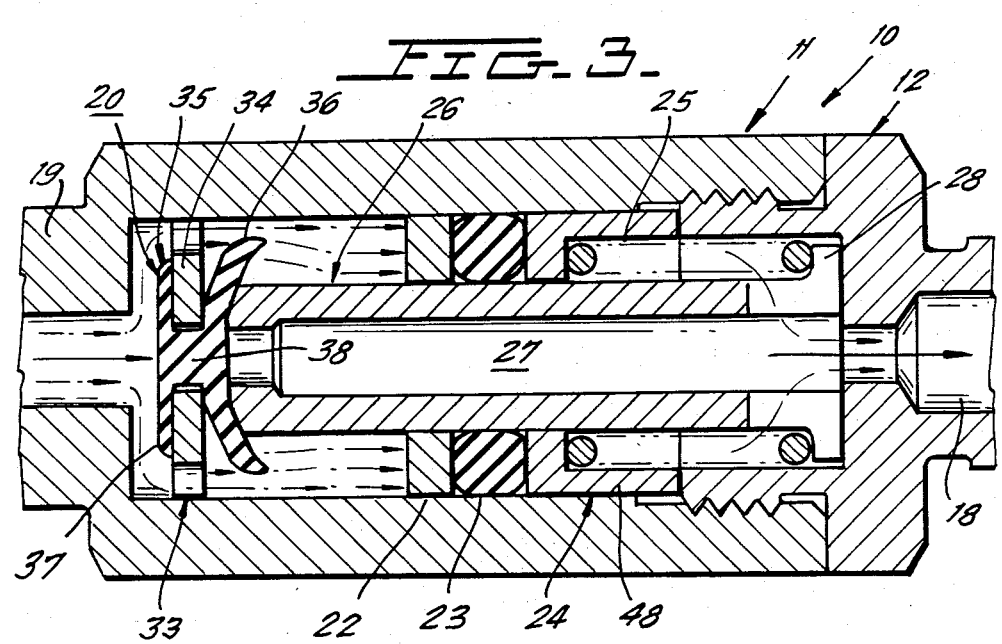

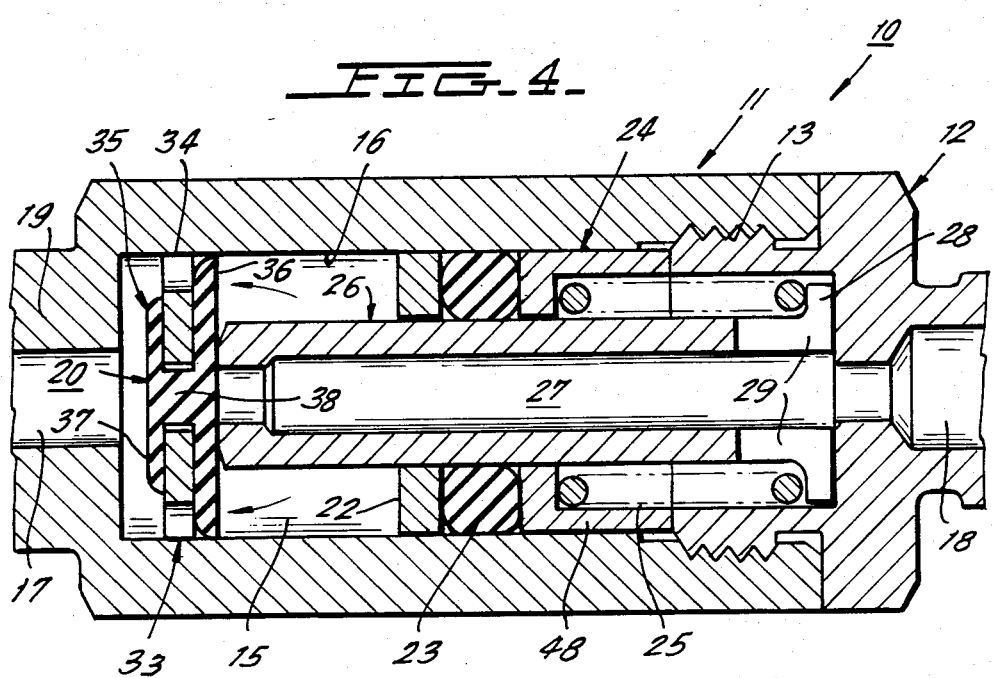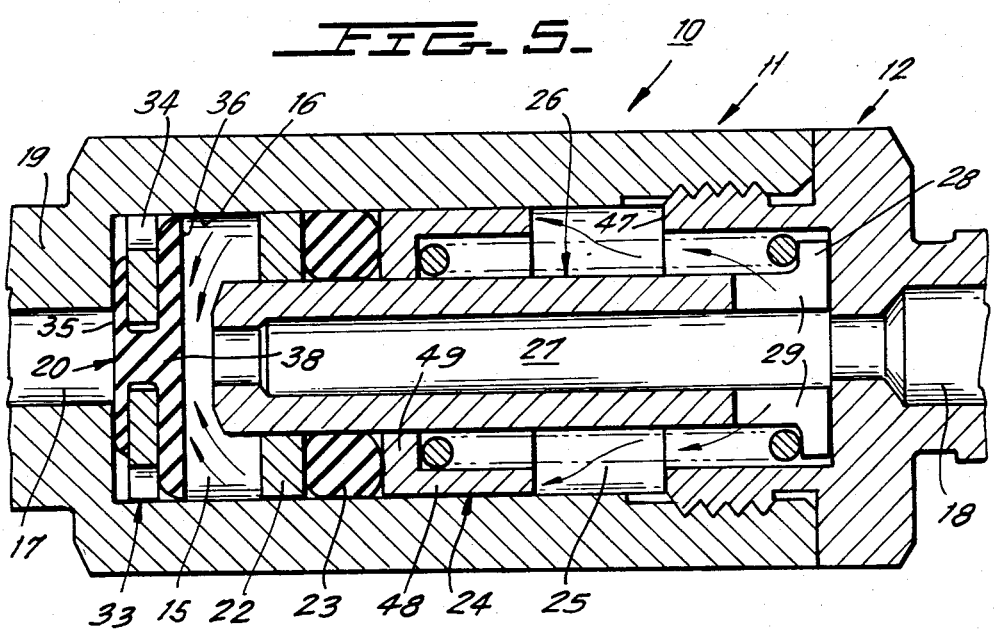

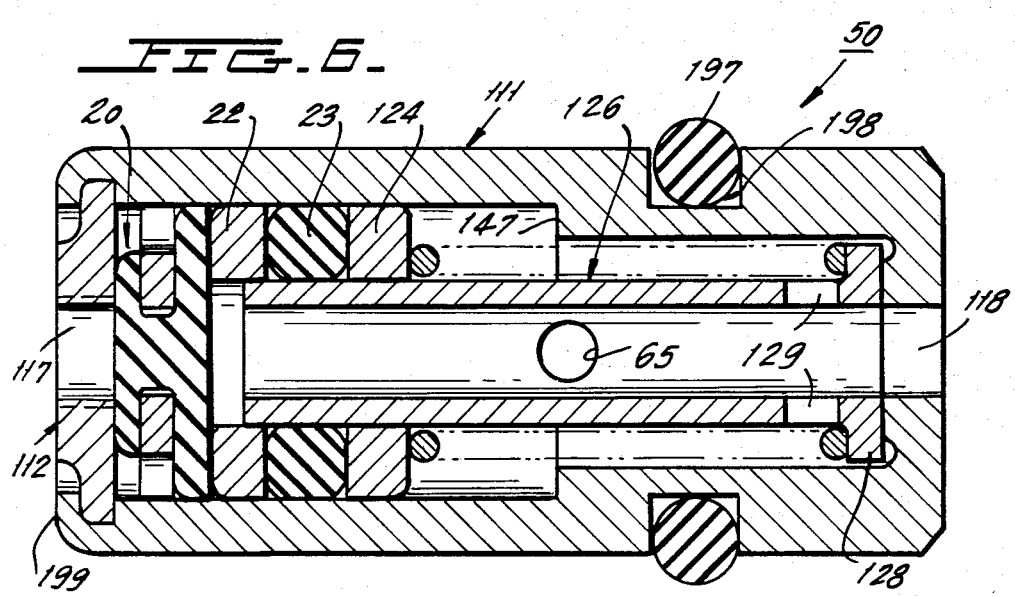
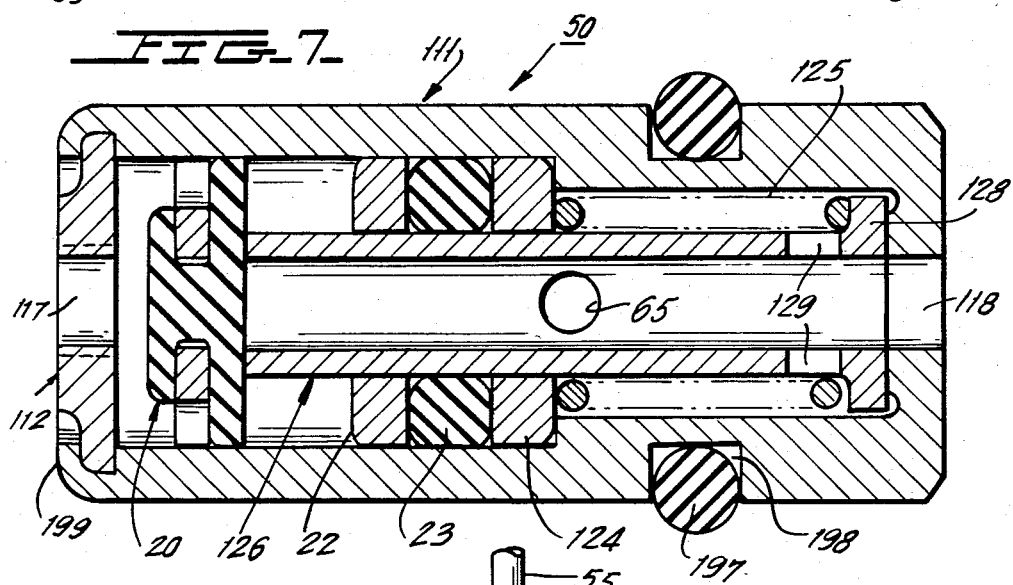
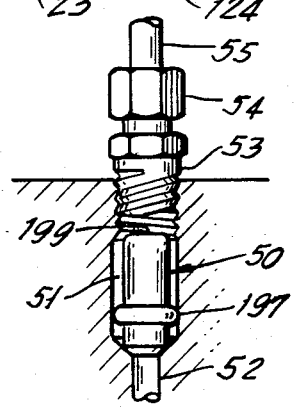

POSITIVE DISPLACEMENT INJECTOR

BACKGROUND OF THE INVENTION

This invention relates to lubricating systems generally and relates more particularly to an injector for accurately controlling the amount of lubricant being injected.

Rotating and sliding parts of mechanical equipment require lubrication to keep friction produced wear to a minimum. As equipment becomes more complex and the number of lubrication points increases, manual lubrication procedures become inefficient and are often unreliable in that maintenance time and costs rise, there is little control over the quantity of lubricant dispensed and the likelihood of overlooking lube points increases. To overcome these problems, the prior art has provided an economical solution in the form of centralized lubrication systems. The centralized system guarantees that each lubrication point receives a quantity of lubricant on an automatic cyclic basis, thereby freeing maintenance personnel for other tasks.

A typical centralized lubrication system includes a reservoir to store lubricant, a pump to deliver lubricant, a device to activate the pump, an injector to dispense a quantity of lubricant to a lube point, and associated tubings and fittings to connect components. In systems of this type the injector is the key to achieving reliable operation. Among injectors common to the prior art are (1) dynamic injectors, (2) metering dispensers and (3) positive displacement injectors utilizing either ball check valves or U-cup seals.

Dynamic injectors require high pressure surges to dispense lubricant around balls contained in a closely fitting hole. High pressure demands of dynamic injectors require the lubrication system to have high pressure pumps, heavy lines, heavy fittings, and other high cost elements. As will hereinafter be seen, lubrication systems constructed in accordance with the instant invention utilize a novel positive displacement injector that operates at relatively low pressures so that the system uses low cost pumps, lines and fittings, resulting in lower system cost.

Metering dispensing devices rely on small orifice openings to restrict lubricant flow. The quantity of lubricant dispersed is not positive, being effected by pump pressure and cycle time. The small orifice openings make these devices sensitive to lubricant contaminants. In contrast, the positive displacement injector of this invention is not sensitive to pump pressure or cycle time, and in a positive manner delivers a premeasured quantity of lubricant each cycle. Small orifice openings are not utilized by the positive displacement injector of this invention so that it is not unduly sensitive to lubricant contaminants.

Prior art positive displacement injectors commonly employ ball check valves and U-cup seals to seal and to control flow direction. These types of injectors are bulkier and more sensitive to contaminants than the injector of this invention. The latter utilizes relatively low cost rugged elements that are readily assembled, while the ball check valve-type requires costly elements having fine finishes and the U-cup seal-type requires special procedures for assembling fragile elements.

Accordingly, the primary object of the instant invention is to provide a novel reliable positive displacement injector that is particularly useful for a centralized lubrication system.

Another object is to provide a positive displacement injector that is of simple, low-cost construction.

Still another object is to provide a positive displacement injector that is rugged and compact.

A further object is to provide a positive displacement injector which utilizes a novel disk-seal to provide low cost face seals on two surfaces and also functions as a check valve.

A still further object is to provide a novel positive displacement filter that utilizes a piston assembly to dispense lubricant and to refill the injector.

These objects as well as other objects of this invention shall become readily apparent after reading the following description of the accompanying drawings.

BRIEF DESCRIPTION OF THE DRAWINGS

FIGS. 1, 2, 3, 4 and 5 are longitudinal cross-sections showing a first embodiment of a positive displacement injector constructed in accordance with teachings of the instant invention. In FIG. 1 the injector elements are shown in position for commencing a dispensing stroke; in FIG. 2 these elements are shown at an intermediate point in the dispensing stroke; in FIG. 3 these elements are shown at the conclusion of the dispensing stroke; in FIG. 4 these elements are shown as the loading stroke commences; and in FIG. 5 these elements are shown at an intermediate point in the loading stroke.

FIGS. 6 and 7 are longitudinal cross-sections of another positive displacement injector constructed in accordance with teachings of the instant invention. In FIG. 6 the injector elements are shown at the beginning of the dispensing stroke and in FIG. 7 these elements are shown at the conclusion of the dispensing stroke.

FIG. 8 is a side elevation illustrating the injector of FIGS. 6 and 7 installed at a lubrication point.

DESCRIPTION OF THE PREFERRED EMBODIMENTS

Figure 1:
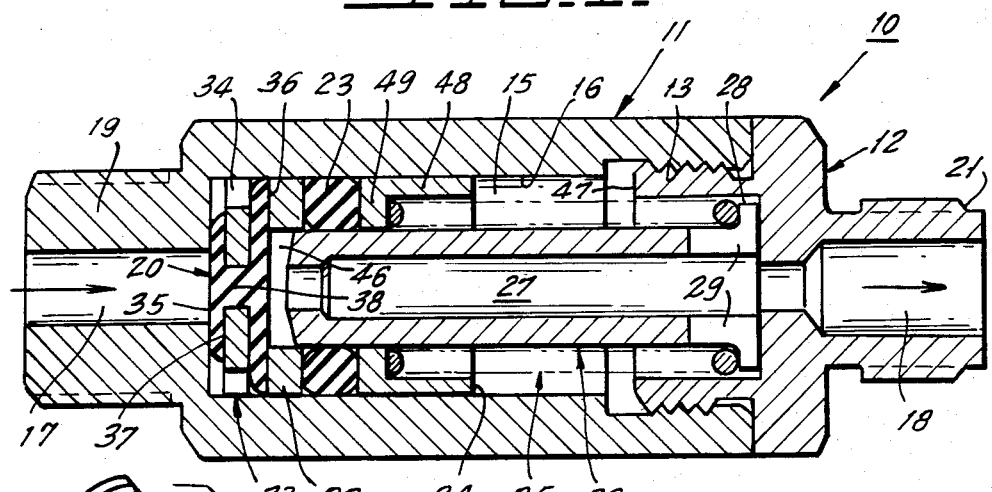
Figure 1A:
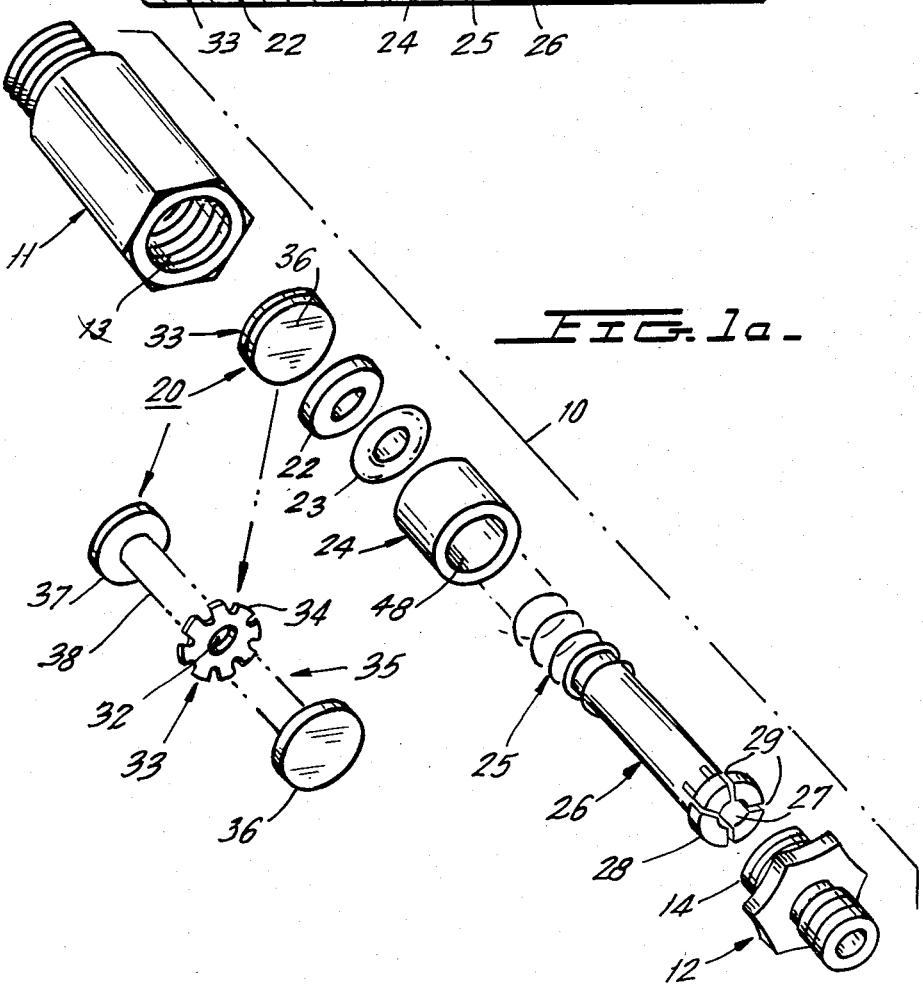
FIG. 1a is an exploded perspective of the elements constituting the positive displacement injector of FIG. 1.

Now referring more particularly to FIGS. 1-5, Positive displacement injector 10 includes a housing constructed of hollow elongated casing 11 having cap 12 at the output or downstream end thereof. Internal threads 13 of casing 11 are in operative engagement with external threads 14 of cap 12 to operatively connect the latter to casing 11. Casing 11 and cap 12 cooperate to define elongated main chamber 15 having cylindrical wall 16. Opposite ends of chamber 15 communicate with respective inlet and outlet ports 17, 18 at opposite ends of injector 10. Inlet port 17 extends through threaded upstream projection 19 of casing 11 and outlet port 18 extends through threaded downstream projection 21 of cap 12.

Disposed within chamber 15 are disk-seal subassembly 20, piston elements 22, 23, 24, cylindrical compression spring 25 and hollow cylindrical guide member 26 on which piston elements 22-24 are slidably mounted. Guide 26 is provided with longitudinal passage 27 and at its downstream end guide 26 flares outward to provide shoulder 28 that abuts cap 12. A plurality of slots 29 at the downstream end of guide 26 constitute apertures for tranverse flow of lubricant into central passage 27.

Disk-seal assembly 20 acts as a valve means and is disposed upstream of piston elements 22-24. Assembly 20 includes rigid cylindrical washer 33 typically constructed of metal and having a plurality of radial notches 34 extending inward from the periphery. Assembly 20 also includes resilient seal member 35 that consists of main sealing disk 36 and auxiliary sealing disk 37 connected by neck 38 that extends through central aperture 32 in washer 33. Main disk 36 is of the same diameter as disk 33 and interior surface 16 of casing 11 normally abutting the downstream face of the former. Auxiliary disk 37 is substantially smaller in diameter than is disk 36 and abuts a portion of the upstream face of washer 33 disposed inboard of notches 34. The latter notches constitute aperture means for the flow of lubricant past assembly 20.

Piston elements 22 and 24 are constructed of rigid material, typically metal, and have resilient piston element 23 sandwiched therebetween. Upstream piston element 22 is a flat ring and central piston element 23 is a resilient O-ring, while downstream piston element 24 consists of ring section 49 having peripheral skirt 48 extending downstream thereof.

Normally the elements of positive displacement injector 10 are in the position shown in FIG. 1. At this time the fluid pressure at inlet port 17 is relaxed below that level required to overcome the force exerted by spring 25, so that the latter, acting through piston elements 22-24, holds disk-seal assembly 20 in its upstream sealing position where auxiliary disk 37 abuts the upstream end wall of chamber 15 to block entry of fluid through inlet port 17. At this time the seal achieved by auxiliary disk 37 also acts to prevent the loss of fluid that tends to drain from lines connected to outlet port 18. An injection stroke is achieved by applying relatively high fluid pressure at inlet port 17. This high pressure must generate forces sufficient to overcome the force of spring 25.

High pressure acting against the upstream face of auxiliary disk 37 forces disk-seal assembly 20 downstream, pushing piston elements 22-24 downstream. This action continues until disk-seal 20 reaches its downstream sealing position of FIG. 2 wherein the downstream face of main disk 36 engages the upstream end of guide 26, thereby blocking the upstream end opening of passage 27. Even though downstream movement of disk-seal assembly 20 is arrested, piston elements 22-24 continue to move downstream in that high pressure lubricating fluid deflects the periphery of main disk 36 downstream and high pressure fluid is now free to act directly on the upstream face of piston element 22. Downstream movement of piston elements 22-24 is arrested when piston skirt 48 engages stop surface 47 provided by cap 12.

During initial downstream motion of disk-seal assembly 20, lubricating fluid exits from outlet port 18 as a result of pressure on fluid in the space 46 (FIG. 1) between assembly 20 and the upstream end of guide 26, being forced axially into passage 27 through its upstream end. At the same time, piston element 24 forces fluid transversely through apertures 29 into passage 27 near the downstream end thereof. As piston elements 22-24 move from their positions of FIG. 2 to their positions of FIG. 3, piston elements 24 continue to force lubricating fluid through apertures 29 into passage 27 and through outlet port 18. The injection or delivery stroke terminates when piston element 24 engages stop surface 47. Now the pressure at inlet port 17 and in chamber 15 stabilizes so that there is no pressure differential on opposite sides of main disk 36 so that the self-biasing nature thereof returns the edge of disk 36 to its undeflected position for blocking upstream fluid flow through notches 34 of valve disk 33.

Upon relaxation of high fluid pressure at inlet port 17, spring 25 acts through piston elements 22-24 to drive fluid upstream as illustrated in FIGS. 4 and 5. This fluid being driven upstream by spring 25 moves disk-seal assembly 20 to its upstream sealing position of FIG. 5 and while this is occurring, lubricating fluid is being forced into passage 27 through the upstream end thereof. Fluid pressures upstream and downstream of piston elements 22-24 tend to equalize while these elements move upstream in that fluid is free to flow out of passage 27 through apertures 29. While piston elements 22-24 move upstream, main disk 36 is in its normal or undeflected sealing position blocking upstream fluid flow through slots 34 of valve disk 33. The loading cycle terminates when spring 25 is extended to a point where piston element 22 abuts disk-seal assembly 20 and forces auxiliary disk 37 into the sealing position shown in FIG. 1. When relatively high fluid pressure is next applied at inlet port 17, the injection stroke previously described is repeated and upon the subsequent relaxation of lubricating fluid pressure at inlet port 17, the loading stroke previously described repeats.

For a typical injector 10 that will deliver as much as 0.3 cc. of lubricant for each downstream stroke of piston elements 22-24, main chamber 15 is approximately 0.94" long and wall 16 thereof is formed on a 0.182" radius. The quantity of lubricating fluid delivered may be varied by changing the length of stroke for piston elements 22-24. This may be achieved by changing the dimensions of one or more of the piston elements 22-24 measured parallel to the piston path of travel, or by changing the location of stop surface 47, as by changing cap 12 or by adding an adjustable projection thereto.

The positive displacement injector of FIGS. 1-5 is installed by a utilizing threaded fitting (not shown) that engages the threads on extension 19, 21 at opposite ends of housing 11, 12. In another embodiment of this invention (FIGS. 6-8) a cartridge style injector 50 which permits mounting in limited spaces is shown. In addition, a cartridge style housing reduces the number of fittings required for installation.

More particularly, positive displacement injector 50 of FIGS. 6-8 is constructed with a housing consisting of hollow elongated casing 111 closed at one end by disk-like cap 112 having a central threaded aperture constituting inlet port 117. Outlet port 118 is at the end of casing 111 remote from cap 112. Cap 112 is fixedly secured to casing 111 by inwardly peening casing edge 199. The outer surface of casing 111 is provided with continuous groove 198 containing O-ring seal 197 that is active when injector 50 is installed by being forced to the bottom of cavity 51 in the equipment to be lubricated. When installed, injector 50 is positioned with outlet 118 at the open end of the lubricating channel 52 leading to a lubrication point (not shown). The internal threads at inlet port 117 are provided to receive a jacking screw (not shown) that is used to remove injector 50 from cavity 51. The upper end of cavity 51 is threaded and receives the tapered threads of fitting 53. The lower end of fitting 53 is spaced from injector 50 so that the former may be tightened to the extent required for fluid sealing engagement between the threads of fitting 53 and cavity 51. Fitting 54 connects the exit end of lubricant supply tube 55 to fitting 53.

In general, the elements within housing 111, 112 have the same shapes, and function in the same manner as corresponding elements in housing 11, 12. Briefly, disposed within housing 111, 112 are disk-seal assembly 20, piston elements 22, 23 and 124, cylindrical compression spring 125 and hollow cylindrical guide member 126. The essential difference between piston elements 24 and 124 is that the latter is merely a ring and does not have a skirt section 48. The essential difference between guides 26 and 126 is that the latter does not have apertures formed by slots 29. Instead, guide 126 is provided with a plurality of spaced apertures 129 positioned immediately downstream of shoulder 128. Apertures 129 are supplemented by apertures 65 disposed upstream of apertures 129 but sill downstream of the most downstream position of piston element 124. An additional difference between injectors 10 and 50 is that in the latter, casing 111 provides stop formation 147 that is engaged by piston element 124 to limit downstream movement of piston elements 22, 23, 124 during the injection stroke.

Since the elements of positive displacement injectors 10 and 50 operate in the same manner for their injection and loading strokes, and these strokes have been described in detail in connection with operation of injector 10, for the sake of brevity without sacrificing clarity, a detailed explanation of the injection and loading strokes for injector 50 has been omitted.

It should be apparent to those skilled in the art that the term "fluid" referred to in the claims covers both liquids and materials of grease-like viscosity.

Although the present invention has been described in connection with a preferred embodiment thereof, many variations and modifications will now become apparent to those skilled in the art. It is preferred, therefore, that the present invention be limited not by the specific disclosure herein, but only by the appended claims.

What is claimed is:

1. A positive displacement injector for controlling the application of fluids, said injector including:

housing means defining a main chamber communicating with an inlet port and an outlet port downstream of said inlet port;

piston means disposed within said main chamber;

valve means movable mounted within said main chamber upstream of said piston means;

hollow guide means within said main chamber defining a fluid passage having its downstream end in communication with said outlet port, and supporting said piston means for movement toward and away from said valve means;

biasing means urging said piston means toward said valve means to operate the latter to an upstream sealing position blocking said inlet port to prevent backflow therethrough;

said valve means being movable downstream by fluid injecting pressure applied at said inlet port, to a downstream sealing position engaging said guide means and blocking flow of fluid into said passage through its upstream end;

aperture means extending from said passage outboard of said guide means at a point downstream of said piston means;

said valve means including a seal in the form of a flexible disk having a peripheral edge portion biased toward a normal undeflected position to block upstream fluid flow past said valve means, said edge portion being deflectable downstream when subjected to fluid injecting pressure;

said valve means also including a relatively stiff disk adjacent the upstream face of said flexible disk and having a periphery with aperture means thereat, said seal when in its normal undeflected position blocking upstream fluid flow through said aperture means of said relatively stiff disk at the said periphery thereof, said edge portion of said flexible disk being deflected downstream by fluid flowing downstream through said aperture means of said relatively stiff disk;

the valve means also including a valve section in front of said relatively stiff disk for blocking said inlet port, and a narrow connecting section positioned at the center of said flexible disk and extending through a central aperture in said relatively stiff disk;

upon application of fluid injecting pressure at said inlet port, fluid forces move said valve means downstream and acting through said valve means force said piston means downstream until movement of said valve means is stopped by engagement with said guide means, after which said peripheral edge portion of said seal deflects downstream permitting direct application of fluid under injecting pressure to said piston means to continue moving the latter downstream until movement thereof is arrested by stop means, with upstream movement of said valve means being effective to force fluid into said passage through its upstream end, and downstream movement of said piston means being effective to force fluid into said passage though said aperture means;

when downstream movement of piston means stops, fluid pressures on opposite sides of said seal equalizes, thereby permitting the edge portion of said seal to assume its said normal undeflected position;

upon subsequent releaxation of fluid injecting pressure at said inlet port, fluid being forced upstream by said piston means as it moves upstream under the influence of said biasing means, and this fluid that is forced upstream by said piston means moving said valve means to said upstream sealing position with some of this fluid entering said passage through its said downstream end, flowing through said aperture means and outboard of said passage to the downstream side of said piston means.

2. A positive displacement injector as set forth in claim 1 in which the housing means includes a hollow casing and a cap at the upstream end of the casing; said stop means being provided by an internal formation of said casing; said cap being fixedly secured to said casing.

3. A positive displacement injector as set forth in claim 1 in which the piston means includes a flexible ring, and first and second rigid piston members disposed on respectively upstream and downstream of said flexible ring.

4. A positive displacement injector as set forth in claim 1 in which the housing means includes a hollow casing and a cap at the downstream end of the casing; said stop means being provided by a portion of said cap.

5. A positive displacement injector as set forth in claim 4 in which there are cooperating screw means removably connecting said cap with said casing.

* * * * *